(12) United States Patent
Greer et al.

(10) Patent No.: US 7,419,526 B2
(45) Date of Patent: Sep. 2, 2008

(54) CONFORMAL FILTER CARTRIDGES AND METHODS

(75) Inventors: Paul A. Greer, North Augusta (CA); Joseph D. Slack, Brockville (CA); Pierre Legare, Brockville (CA)

(73) Assignee: 3M Innovative Properties Company, St. Paul, MN (US)

( * ) Notice: Subject to any disclaimer, the term of this patent is extended or adjusted under 35 U.S.C. 154(b) by 451 days.

(21) Appl. No.: 11/071,664

(22) Filed: Mar. 3, 2005

(65) Prior Publication Data
US 2006/0196157 A1    Sep. 7, 2006

(51) Int. Cl.
*B01D 53/04* (2006.01)
*B01D 46/12* (2006.01)

(52) U.S. Cl. .............................. 55/512; 55/513; 55/516; 55/518; 55/497; 55/500; 55/501; 55/509; 55/521; 55/DIG. 35; 96/135; 96/138; 96/153

(58) Field of Classification Search ................ 96/135, 96/138, 153; 55/512, 513, 516, 518, 497, 55/500, 501, 509, 521, DIG. 35
See application file for complete search history.

(56) References Cited

U.S. PATENT DOCUMENTS

| | | | | |
|---|---|---|---|---|
| 1,223,114 | A | * | 4/1917 | Diehl ........................ 361/436 |
| 1,499,864 | A | * | 7/1924 | Gordon ........................ 55/484 |
| 2,469,367 | A | * | 5/1949 | Burgess et al. .............. 422/120 |
| 2,482,679 | A | * | 9/1949 | McAllister et al. ............. 55/475 |
| 2,682,315 | A | * | 6/1954 | Evans ........................ 55/518 |
| 3,971,373 | A | | 7/1976 | Braun |
| 4,046,939 | A | | 9/1977 | Hart |
| 4,280,491 | A | | 7/1981 | Berg et al. |
| RE30,782 | E | | 10/1981 | Van Turnhout |
| RE31,285 | E | | 6/1983 | Van Turnhout et al. |
| 4,422,861 | A | | 12/1983 | Dusza |
| 4,437,460 | A | | 3/1984 | Glynn |
| 4,462,399 | A | | 7/1984 | Braun |
| 4,548,626 | A | | 10/1985 | Ackley et al. |
| 4,586,500 | A | | 5/1986 | Glynn |
| 4,850,346 | A | | 7/1989 | Michel et al. |
| 4,886,056 | A | | 12/1989 | Simpson |
| 4,934,361 | A | | 6/1990 | Michel et al. |
| 4,965,887 | A | | 10/1990 | Paoluccio et al. |
| 5,022,901 | A | | 6/1991 | Meunier |
| 5,033,465 | A | | 7/1991 | Braun et al. |
| 5,036,844 | A | | 8/1991 | Pouchot et al. |

(Continued)

FOREIGN PATENT DOCUMENTS

EP     0109514 A1    5/1984

(Continued)

*Primary Examiner*—Duane Smith
*Assistant Examiner*—Minh-Chau T. Pham
(74) *Attorney, Agent, or Firm*—Karl G. Hanson

(57) ABSTRACT

Conformal filter cartridges, filtering apparatus using the conformal filter cartridges, and methods of manufacturing the conformal filter cartridges are disclosed. The conformal filter cartridges may include a bed of filter material between a pair of support plates, wherein the major surfaces of the support plates facing the bed of filter material are each curved about at least one axis. The curvature imparted by the support plates provides the conformal configuration to the filter cartridge. The bed of filter material may be loose particulate filter material that may be retained under residual compression between the support plates within the filter cartridge.

32 Claims, 5 Drawing Sheets

U.S. PATENT DOCUMENTS

| | | | |
|---|---|---|---|
| 5,063,926 | A | 11/1991 | Forsgren et al. |
| 5,078,132 | A | 1/1992 | Braun et al. |
| 5,125,402 | A | 6/1992 | Greenough |
| 5,222,488 | A | 6/1993 | Forsgren |
| 5,344,626 | A | 9/1994 | Abler |
| 5,432,175 | A | 7/1995 | Piwinski et al. |
| 5,496,507 | A | 3/1996 | Angadjivand et al. |
| 5,496,785 | A | 3/1996 | Abler |
| 5,696,199 | A | 12/1997 | Senkus et al. |
| 5,763,078 | A | 6/1998 | Braun et al. |
| 5,924,420 | A | 7/1999 | Reischel et al. |
| 6,014,971 | A | 1/2000 | Danisch et al. |
| 6,119,691 | A | 9/2000 | Angadjivand et al. |
| 6,119,692 | A | 9/2000 | Byram |
| 6,139,308 | A | 10/2000 | Berrigan et al. |
| 6,186,140 | B1 | 2/2001 | Hoague |
| 6,205,299 | B1 | 3/2001 | Kusaka et al. |
| 6,214,094 | B1 | 4/2001 | Rousseau et al. |
| 6,216,693 | B1 | 4/2001 | Rekow et al. |
| 6,228,152 | B1 * | 5/2001 | Guerin et al. ............ 96/135 |
| 6,277,178 | B1 | 8/2001 | Holmquist-Brown et al. |
| 6,375,886 | B1 | 4/2002 | Angadjivand et al. |
| 6,391,429 | B1 | 5/2002 | Senkus et al. |
| 6,397,458 | B1 | 6/2002 | Jones et al. |
| 6,398,847 | B1 | 6/2002 | Jones et al. |
| 6,406,657 | B1 | 6/2002 | Eitzman et al. |
| 6,409,806 | B1 | 6/2002 | Jones et al. |
| 6,454,986 | B1 | 9/2002 | Eitzman et al. |
| 6,457,473 | B1 | 10/2002 | Brostrom et al. |
| 6,478,025 | B1 | 11/2002 | Yort et al. |
| 6,591,837 | B1 | 7/2003 | Byram |
| 6,627,563 | B1 | 9/2003 | Huberty |
| 6,660,210 | B2 | 12/2003 | Redmond et al. |
| 6,715,490 | B2 | 4/2004 | Byram |
| 6,732,733 | B1 | 5/2004 | Brostrom et al. |
| 6,743,464 | B1 | 6/2004 | Insley et al. |
| 2004/0055604 | A1 | 3/2004 | Viner et al. |

FOREIGN PATENT DOCUMENTS

| | | |
|---|---|---|
| EP | 0 362 920 B1 | 4/1993 |
| EP | 0 804 262 B1 | 12/2001 |
| GB | 2254017 A | 9/1992 |
| WO | WO 01/78839 A2 | 10/2001 |
| WO | WO 01/78839 A3 | 10/2001 |
| WO | WO 03/073011 A2 | 9/2003 |
| WO | WO 03/090872 A1 | 11/2003 |
| WO | WO 03/090873 A1 | 11/2003 |
| WO | WO 2004/026408 A1 | 4/2004 |

\* cited by examiner

CONFORMAL FILTER CARTRIDGES AND METHODS

The present invention relates to the field of filter cartridges that are suitable for use, for example, in a respirator, an air filtration unit, or other filtering apparatus.

A filter cartridge often needs to be replaceable so that when it reaches the end of its useful life, it can be removed from the filtering apparatus in which it is used and can be replaced by a new filter cartridge. Filter cartridges are commonly in the form of a cartridge, the housing of which may be provided with some form of attachment mechanism that enables the cartridge to be fitted onto, and removed from, the filtering apparatus in which it is used. In other cases—for example, certain types of respiratory masks—the filtering apparatus is intended to be discarded when the filter cartridge reaches the end of its useful life, and, in those cases, the filter cartridge can be an integral part of the filtering apparatus.

Sorbent particles such as, for example, activated carbon are commonly used in respirators as gas or vapor filters. The filters generally are classified according to the manner in which the sorbent material is supported in the filter and include loaded nonwoven filters, loaded foam filters, bonded sorbent filters, and packed bed filters.

Filter cartridges may be described as planar or conformal. Planar filter cartridges typically include a bed of filter material contained within a volume that has flat or planar surfaces through which fluids to be filtered (such as air) enter and exit the bed of filter material. Where the filter materials are in the form of loose sorbent particles, planar filter cartridges are advantageously constructed by conventional storm filling techniques.

Conformal filter cartridges typically curve or conform more closely to the curvature inherent in human face morphology by using a filter cartridge that includes at least one curved surface. The closer conformance may reduce the bulk of the filtering apparatus. The curvature of conformal filter cartridges is not, however, compatible with conventional "storm-filling" of the filter cartridge with loose filter material as discussed in, for example, International Patent Publication WO 03/090872 (Schlaechter). In that document, one approach to providing a conformal filter cartridge includes vibrating the filter cartridge housing during loading to increase the density of the sorbent particles loaded therein. Disadvantages of that approach may include, however, the need to vibrate the housing, the uncertainties associated with vibratory filling, etc.

Other approaches to providing conformal filter cartridges may include, for example, loaded nonwoven filters in the form of webs that contain sorbent particles in the interstices between the fibers forming the web (see, for example, U.S. Pat. No. 3,971,373) and loaded foam filters that contain adsorbent particles dispersed within and bonded in the foam structure (see, for example, U.S. Pat. No. 4,046,939). Such loaded structures generally suffer from having a lower sorbent particle density than packed beds of loose filter material. As a result, the thickness of the filter cartridge may need to be increased to the point at which the benefits of the conformal shape are negated.

An advance over loaded nonwoven and foam filter cartridges was the invention of bonded sorbent filter cartridges (see, for example, U.S. Pat. Nos. 5,033,465 and 6,391,429 B1). In bonded sorbent filter cartridge technology, the sorbent particles are typically formed in a unitary structure using polymer particles that bind the sorbent particles together. Bonded sorbent structures can increase sorbent particle density over other loaded structures and can be formed with curved surfaces. Potential disadvantages may include, for example, additional costs associated with the manufacture of bonded sorbent filter cartridges, etc.

SUMMARY OF THE INVENTION

The present invention provides conformal filter cartridges, filtering apparatus using the conformal filter cartridges, and methods of manufacturing the conformal filter cartridges. The conformal filter cartridges of the present invention preferably include a bed of filter material between a pair of support plates, wherein the major surfaces of the support plates facing the bed of filter material are each curved about at least one axis. The curvature imparted by the support plates provides the conformal configuration to the filter cartridge.

It may be preferred that the bed of filter material be loose particulate filter material that is retained under residual compression between the support plates within the filter cartridge. To reduce premature breakthrough and promote full use of the filter material, it may also be preferred that the thickness of the filter material between the two support plates be uniform (within normal manufacturing tolerances).

Manufacture of the filter cartridges involves depositing a bed of filter material on a flat (within normal manufacturing tolerances) horizontally oriented support plate located within a housing base. It may be preferred that the bed of filter material be deposited by storm-filling in view of its suitability for providing uniform thickness packed beds with desired packing density. After the filter material has been deposited, the support plates may preferably be deformed such that the major surfaces of the support plates that face the bed of filter material each have a curvature about at least one axis.

It may also be preferred that the deformation result in residual compression of the bed of filter material such that at least a portion of the bed is retained in compression between the support plates. In some embodiments, it may be preferred that the residual compression be provided by an elastically deformed support plate located within the conformal filter cartridge.

One potential advantage of the manufacturing methods of the present invention is that conventional storm-filling techniques may be used to deposit the bed of filter material which is economical and can enhance uniformity in the density of the filter material. Another potential advantages is that if layers of different filter materials are to be used in the same filter cartridge, storm-filling offers a convenient method of depositing the layers while maintaining separation between the different layers.

In one aspect, the present invention provides a method of manufacturing a conformal filter cartridge by providing a housing that includes a housing base and a housing cover, wherein the housing base and the housing cover define an enclosed volume when assembled together, wherein the housing further includes an inlet port and an outlet port. The method further includes depositing a bed of filter material within the housing base, wherein a first support plate is located within the housing base before the depositing and wherein a major surface of the first support plate faces the filter material. The first support plate is deformed after depositing the bed of filter material, wherein after deformation the major surface of the first support plate that faces the filter material comprises curvature about at least one axis. The housing cover is attached to the housing base, wherein the bed of filter material is contained within the housing such that a fluid to be filtered passes through the inlet port, the filter material, and the outlet port.

In another aspect, the present invention provides a conformal filter cartridge that includes a housing with an inlet and an outlet. A bed of filter material is contained within the housing such that a fluid to be filtered passes through the inlet, the filter material, and the outlet. A first support plate is positioned between the bed of filter material and the outlet, wherein the first support plate has a major surface facing the bed of filter material that includes curvature about at least one axis. A second support plate is positioned between the bed of filter material and inlet, wherein the second support plate includes a major surface facing the bed of filter material that also includes curvature about at least one axis. At least a portion of the bed of filter material is retained under residual compression between the first and second support plates.

These and other features and advantages of the present invention may be described in connection with various exemplary embodiments described below.

BRIEF DESCRIPTIONS OF THE FIGURES

DESCRIPTION OF EXEMPLARY EMBODIMENTS OF THE INVENTION

Figure 1:
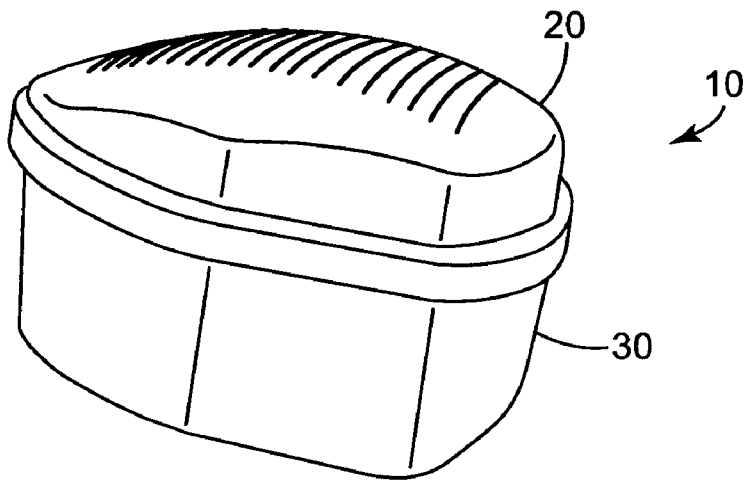
FIG. 1 is a perspective view of an exemplary conformal filter cartridge according to the present invention.

In the following detailed description of exemplary embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Figure 2:
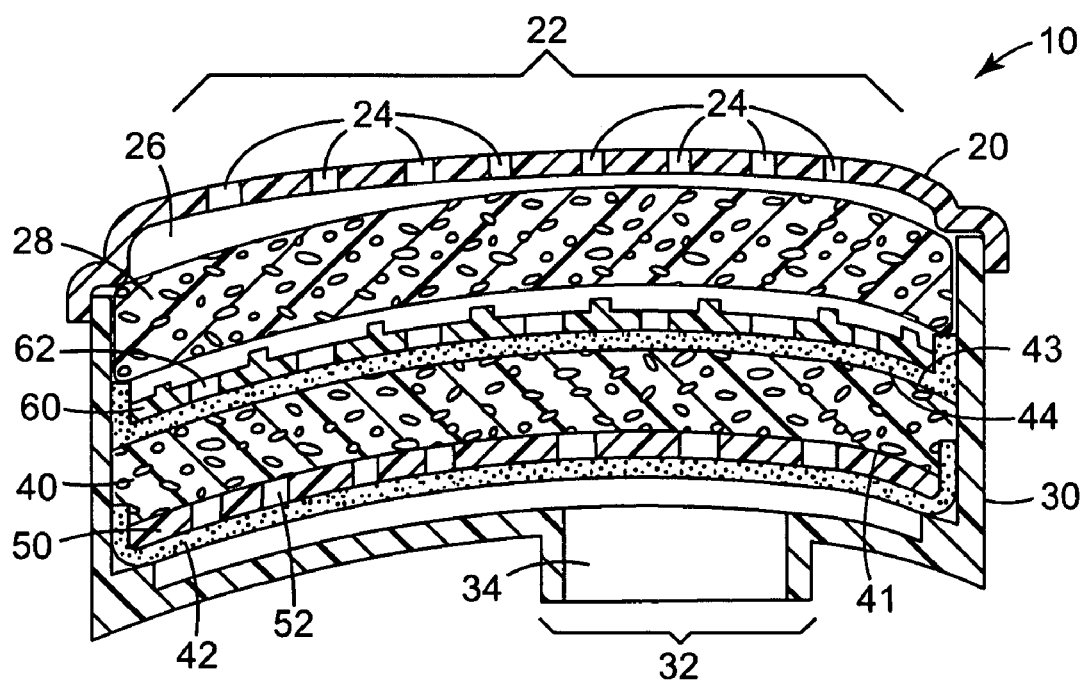
FIG. 2 is a cross-sectional view of the conformal filter cartridge of FIG. 1.

One exemplary embodiment of a conformal filter cartridge 10 is depicted in a perspective view in FIG. 1 and a cross-sectional view in FIG. 2. The filter cartridge 10 may be used in connection with a variety of different filtering apparatus such as, for example, respirators, air filtration units, etc. The filter cartridge 10 may generally be described as having a housing defining a volume, an inlet port through which a fluid to be filtered enters the volume defined by the housing, a bed of filter material located within the housing, and an outlet port through which the filtered fluid exits the volume defined by the housing. The bed of filter material is located within the housing volume such that fluid entering through the inlet port must pass through the filter material before it exits the housing through the outlet port.

The housing is preferably impermeable to the fluid to be filtered under the conditions in which the filter cartridge is to be used. Some potentially suitable materials for the housing may include one or more of plastics, metals, ceramics, composites, etc.

In the exemplary embodiment depicted in FIGS. 1 & 2, the housing includes a housing cover 20 attached to a housing base 30. It may be preferred that the cover 20 be attached to the base 30 by any technique that provides a sealed connection between the cover 20 and base 30 such that the fluid to be filtered (for example, air) does not pass through the junction between the cover 20 and base 30, thus bypassing one or more of the filtering elements located in the housing (it being understood that in some embodiments one of the ports may be formed at that junction, in which case the connection should not be sealed). Examples of suitable connections may include one or more, for example, adhesive bonding, welding (for example, ultrasonic, vibration, thermal, RF, etc.), mechanical fasteners (with gaskets if necessary), etc.

A series of openings 24 are provided in the housing cover 20 to function as the inlet port 22 to admit fluid (for example, air) into the volume defined by the housing cover 20 and housing base 30. The openings 24 are provided as a series of slots in the housing cover 20, although the openings could take any desired form (for example, circular voids, triangular voids, rectangular voids, a porous mesh, screen, etc.).

The housing also includes an outlet port 32 in the form of a cylindrical opening 34. Although not depicted, the opening 34 may include structure designed to releasably attach the filter cartridge 10 to a larger filtering apparatus as described herein. The outlet port 32 may take the cylindrical shape depicted in FIG. 2, although any other suitable shape may be used.

As seen in FIG. 2, the filter cartridge 10 includes a bed of filter material 40 located within the housing. The filter material 40 is preferably located between the inlet port 22 and the outlet port such that fluids to be filtered must pass through the filter material 40 when moving through the housing from the inlet port 22 to the outlet port 32.

The bed of filter material 40 may take a variety of forms, although it may preferably be in the form of loose adsorbent particles. The adsorbent particles may preferably be of any type known to be suitable for removing gases and vapors from fluids such as air to be inhaled through a respirator. Examples of some potentially suitable adsorbent particles may include, for example, ion exchange resins, activated charcoal (that may be impregnated with, for example, amine triethylenediamine or heavy metal salts such as copper, silver, zinc, molybdenum, etc.), zeolites, treated activated alumina, etc. See, for example, U.S. Pat. No. 5,696,199 to Senkus et al. By "loose" as used herein, it is meant that the adjacent particles are not physically attached to each other to form a self-supporting filter structure, for example, through the use of binders such as polymers, foams, etc. As a result, the loose particles may preferably be in granular or pellet forms that are amenable to delivery through storm-filling or similar processes.

In some instances, a filter element 28 as depicted in FIG. 2 may be located within the volume 26 defined between the housing cover 20 and the upper support plate 60. The filter element 28 may take any suitable construction, for example, nonwoven pleated web, foam, combinations of two or more filters, etc. It may be provided as a supplement to the bed of filter material 40. The filter element 28 may be a gaseous and/or particulate filter, examples of which are shown or discussed in the following patent documents: U.S. Pat. No. 6,743,464 to Insley et al., U.S. Pat. No. 6,627,563B1 to Huberty, U.S. Pat. No. 6,454,986 to Eitzman et al., U.S. Pat. Nos. 6,660,210, 6,409,806, and 6,397,458 to Jones et al., U.S. Pat. No. 6,406,657 to Eitzman et al, U.S. Pat. No. 6,391,429 to Senkus et al., U.S. Pat. No. 6,375,886 to Angadjivand et al., U.S. Pat. No. 6,214,094 to Rousseau et al., U.S. Pat. No. 6,139,308 to Berrigan et al., and U.S. Pat. No. 6,119,691 to Angadjivand et al., U.S. Pat. Nos. 5,763,078 and 5,033,465 to Bran et al., and U.S. Pat. Nos. 5,496,785 and 5,344,626 to Abler.

It may be preferred that the bed of filter material 40 be contained between porous sheets 42 and 44 and support plates 50 and 60 located on each of the major sides 41 and 43 of the bed of filter material 40. The lower porous sheet 42 is located between the lower support plate 50 and the outlet port 32 while the upper porous sheet 44 is located between the bed of filter material 40 and the upper support plate 60.

The porous sheets 42 and 44 are preferably permeable to the fluid to be filtered but, at the same, are essentially impermeable to the bed of filter material 40 (for example, adsorbent particles). The porous sheets 42 and 44 may preferably, but not necessarily, be fibrous nonwoven sheets of particulate filtering material suitable for use in filtering apparatus (for example, respirators) for removing particulate material from a fluid such as, for example, air. One potentially suitable example of a particulate filter material is available under the tradename FILTRETE from 3M Company of St. Paul, Minn., USA. The particulate filter material can be made from webs of electrically-charged microfibers such as melt-blown microfibers. See, for example, U.S. Pat. Nos. 6,406,657 B1, 6,375,886 B1, 6,119,691, and 5,496,507. The fibers also can be fibrillated electrically-charged fibers—see U.S. Pat. Re. Nos. 30,782 and Re. 31,285. Further, the fibers can have fluorine atoms at their surfaces to improve their oily-mist resistance. See, for example, U.S. Pat. Nos. 5,432,175 B1, 6,409,806 B1, 6,398,847 B1, and 6,397,458 B1.

Figure 3:
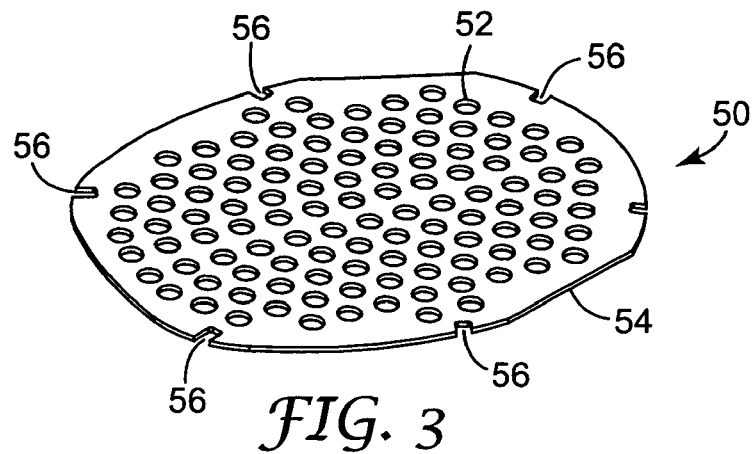
FIG. 3 is a perspective view of the lower support plate in the conformal filter cartridge of FIGS. 1 & 2.

The lower support plate 50 from the conformal filter cartridge of FIGS. 1 & 2 depicted in FIG. 3 and preferably includes openings 52 distributed over its major surfaces such that fluid (for example, air) can flow through the support plate 50 into or out of the filter material 40. The openings 52 may take any suitable shape or distribution, although it may be preferred that they be distributed over a sufficiently large area such that flow through a majority of the filter material 40 is promoted.

Figure 4:
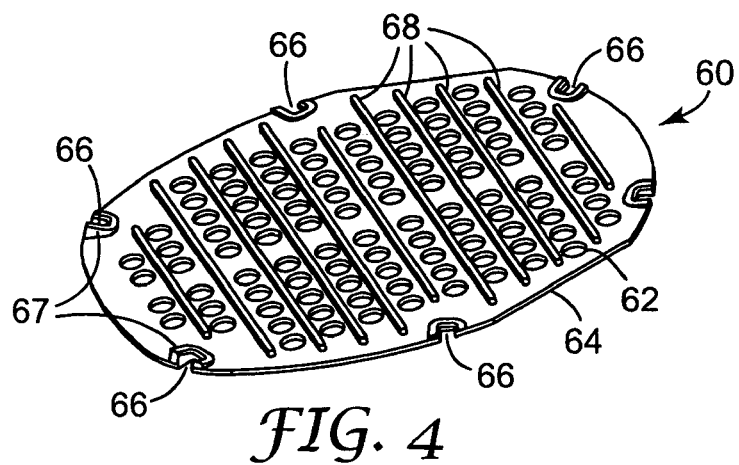
FIG. 4 is a perspective view of the upper plate in the conformal filter cartridge of FIGS. 1 & 2.

The upper support plate 60 from the conformal filter cartridge of FIGS. 1 & 2 is depicted in FIG. 4 and also preferably includes openings 62 distributed over its major surfaces such that fluid (for example, air) can flow through the support plate 60 into or out of the filter material 40. As with the lower support plate 50, the openings 62 in the upper support plate 60 may take any suitable shape or distribution, although it may be preferred that they be distributed over a sufficiently large area such that flow through a majority of the filter material 40 is promoted.

As seen in FIG. 2, it may be preferred that the porous sheets 42 and 44 be slightly larger than the support plates such that a portion of the porous sheet folds upward around the edges of the support plates (preferably as the support plates 50 and 60 are inserted into the housing base 30). For example, porous sheet 42 as seen in FIG. 2 folds upward around the periphery 54 of lower support plate 50 while porous sheet 44 folds upward around the periphery 64 of upper support sheet 60. The oversized porous sheets 42 and 44 may serve to create a better seal around the edges of the support plates 50 and 60 such that the filter material 40 is inhibited from escaping around the edges 54 and 64 of the support plates 50 and 60. Other techniques of creating edge seals around the peripheries of the support plates 50 and 60 may, of course, be used in place of oversizing the porous sheets 42 and 44.

Although the support plates 50 are, in the depicted embodiment, paired with a porous sheet 42 or 44 to retain the bed of filter material 40 in place within the filter cartridge, it should be understood that other structures could be used. For example, the functions of the support plates and porous sheets may be combined within a single unitary structure by using, for example, insert molded screen material to bridge the openings in the support plates such that the filter material cannot escape through those openings.

As used herein, the term "support plate" means any structure that is capable of retaining the bed of filter material in a curved configuration within the filter cartridge while allowing the fluid to be filtered to pass into and out of the bed of filter material. The support plates of the present invention may also preferably be capable of distributing compressive forces over the major surfaces of the bed of filter material when in the curved configuration. Where the support plates such as those depicted in FIGS. 3 and 4 include openings that would otherwise allow the filter material to escape, additional elements (such as porous sheets 42 and 44) may be used in addition to the support plates.

Figure 5:
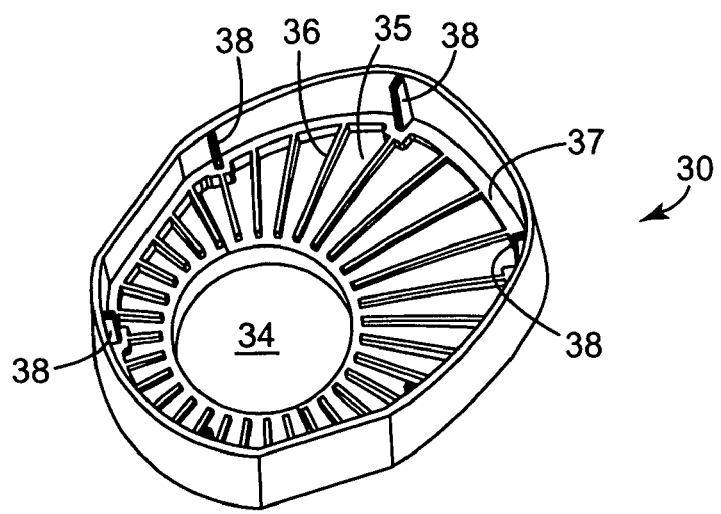
FIG. 5 is a perspective view of the housing base of the conformal filter cartridge of FIGS. 1 & 2.

FIG. 5 is a perspective view of the housing base 30 from the conformal filter cartridge of FIGS. 1 & 2 with the filter material 40, porous sheets 42 and 44, and support plates 50 and 60 removed. The housing base 30 includes port 32 and a series of spacers 36 on the lower surface 35. The spacers 36 may be used to hold the porous sheet 42 and lower support plate 50 slightly above the lower surface 35 of the housing base 30. That spacing between the filter material 40 and the lower surface 35 may assist in distributing fluid flow through a majority of the filter material 40. In addition, the spacers 36 may preferably be oriented radially with respect to opening 34 as seen in FIG. 5 to further promote fluid flow over the majority of the surface filter material 40 facing the lower surface 35. Although spacers 36 are depicted as elongated structures, any structure (for example, posts, etc.) that serves to maintain a space between the filter material 40 and the lower surface 35 may be used. A shoulder 37 may also be provided about the periphery of the lower surface 35 to provide support to the edge of the lower support plate 50 and porous sheet 42 and, perhaps, facilitate sealing about the periphery 54 of the lower support plate 50.

Another feature depicted in FIG. 5 are ribs 38 distributed about the periphery of the housing base 30. The ribs 38 may preferably cooperate with notches 56 and 66 provided in the support plates 50 and 60 to serve as alignment structures that assist in aligning the support plates 50 and 60 within the housing base 30 during insertion and deformation. It may be preferred that the porous sheets 42 and 44 also include notches at the appropriate locations. In addition, the ribs 38 may also serve to assist in retaining the upper support plate 60 in its curved configuration by providing material for the welding process described in more detail herein.

The housing cover 20, housing base 30, lower support plate 50, and upper support plate 60 may be formed from essentially any material or materials known to be suitable for forming such structures. For example, the different structural components may preferably be formed from one or more polymeric materials by, for example, a thermoforming (for example, vacuum-forming) or an injection molding process.

Figure 6:
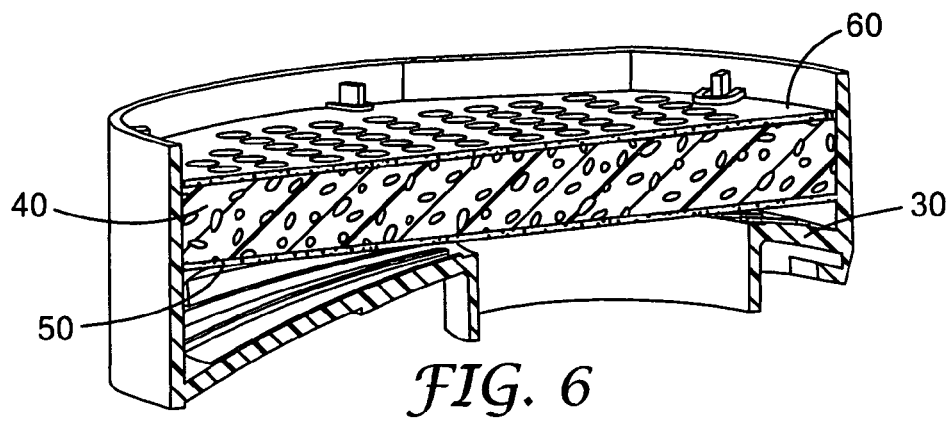
FIG. 6 is a perspective cross-sectional view of a portion of a filter cartridge of the present invention with a flat bed of filter material located therein.
Figure 7:
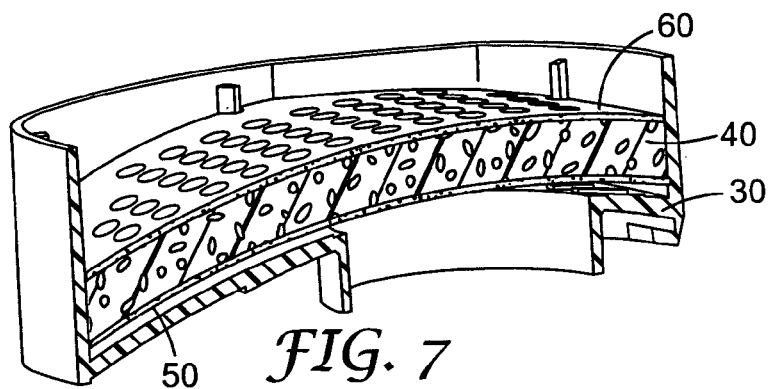
FIG. 7 is a perspective cross-sectional view of the conformal filter cartridge of FIG. 6 after deformation of the bed of filter material.
Figure 8:
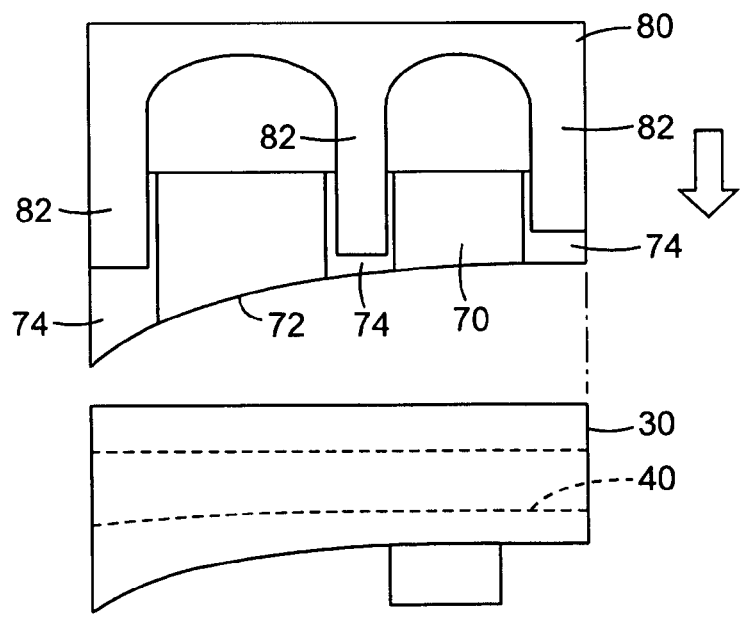
FIG. 8 is a view of one apparatus that may be used to deform a bed of filter material in a filter cartridge of the invention.

One exemplary method of manufacturing conformal filter cartridges according to the present invention is depicted in FIGS. 6-8. A partially assembled filter cartridge is depicted in FIG. 6. The housing base 30 includes a lower support plate 50 (associated porous sheet 42 has been removed for clarity) located therein with a bed of filter material 40 located thereon. Above the filter material, an upper support plate 60 (with associated porous sheet 44 removed for clarity) has been placed on the bed of filter material 40.

It may be preferred that the filter material 40 be in the form of loose particulates that are deposited by techniques that result in a level bed of filter material 40 with a selected density or packing and a uniform bed thickness. As discussed herein, conventional storm filling methods may preferably be used. Storm filling typically involves pouring the particles through a series of screens that scatter the particles as they fall, creating a level bed of filter material 40. As in the manufacture of conventional packed bed filters, the bed of filter material 40 is preferably deposited on a flat surface that is level (with respect to, for example, horizon). In the depicted embodiment, that surface is provided by the lower support plate 50.

As with conventional packed bed filters, the bed of filter material 40 is preferably placed under compression to enhance the packing density of the filter material 40. Unlike conventional packed bed filters, however, the compression is accompanied by deformation of the upper and lower and support plates 50 and 60 such that the bed of filter material 40 and support plates 50 and 60 have a curvature as depicted in FIG. 7.

With the bed of filter material 40 and the upper and lower supports 50 and 60 in place as seen in FIG. 6, curvature is imparted to the bed of filter material 40 and the support plates 50 and 60 using a compression tool 70 with a curved surface 72 as depicted in FIG. 8. The compression tool 70 may preferably be driven against the upper support plate 60 while the housing base 30 is supported from below (or vice versa, it being understood that any system/method that imparts relative movement between the components and achieves the desired compression could be used). The compression may preferably force the lower support plate 50 (and associated porous sheet 42) against the spacers 36 and shoulder 37 provided in the housing base 30 of FIG. 6.

As a result, the upper support plate 60, bed of filter material 40 and lower support plate 50 are all deformed into the curved configuration seen in FIG. 7. It may be preferred that the deformation of the lower and upper support plates 50 and 60 be primarily within the elastic range, i.e., removal of the compressive force would substantially result in return of the plates 50 and 60 to their flat configurations (or near thereto) as seen in FIG. 6. The compression and deformation may preferably result in a bed of filter material 40 that has a uniform thickness or bed depth between the major surfaces of the upper and lower support plates 50 and 60.

While the tool 70 is forced against the upper support plate 60, the upper support plate 60 is preferably secured in the shape seen in FIG. 7 to retain the bed of filter material 40 in the curved shape. Attachment of the upper support plate 60 to the housing base 30 may be required to retain the bed 40 in residual compression between the support plates 50 and 60. Retaining residual compression of the bed 40 may be preferred to reduce flow channeling through the packed bed 40. In addition, attachment of the upper support plate 60 also constrains it from returning to its flat configuration as seen in FIG. 6 (particularly where the deformation is in the elastic range as discussed herein). It may be preferred that the residual compression of at least a portion (or even substantially all) of the bed 40 be provided by the elastically deformed support plates located within the conformal filter cartridge 10.

Attachment of the upper support plate 60 to the housing may be achieved by any suitable technique or combination of techniques. Examples of potentially suitable techniques may include, for example, adhesives, mechanical fasteners (for example, threaded fasteners, clamps, rivets, etc.), welding, etc. One exemplary method may involve staking or welding the upper support plate 60 to the housing base 30 at a number of locations about the periphery 64 of the support plate 60. In the exemplary embodiment, it may be preferred that the welding occur at the ribs 38 located in the housing base 30 because of the larger bed of material available at those locations.

One exemplary welding technique may involve the use of multi-prong staking horn 80 that may preferably integrated with the compression tool 70 as depicted in FIG. 8. The staking prongs 82 may preferably be located about the tool 70 at locations that correspond to the ribs 38 in the housing base 30. After the compression tool 70 deforms and compresses the upper support plate 60, bed 40 and lower support plate 50, ultrasonic energy can be directed through the prongs 82 of the staking horn 80 to accomplish the welding process after which the compression tool 70 and staking horn 80 can be withdrawn while the deformation and compression of the bed are retained as discussed herein.

It may be preferred that at least some of the notches 66 include weld collars 67 as depicted in, for example, FIG. 4. The weld collars 67 provide additional material that may facilitate welding of the support plate 60 to the ribs 38 of the housing base 30. In addition, the top surfaces of the weld collars 67 may preferably be slanted relative to the major surface of the support plate 60 such that the weld collars 67 present a horizontal surface to the staking prongs 82 of the horn 80 when the support plate 60 is deformed into the curved configuration depicted In FIG. 7. Doing so may simplify design of the staking prongs 82 of the horn 80 because the flat surfaces presented by the weld collars 67 can be presented to complementary flat surfaces on the staking prongs 82.

To enhance retention of the compressive forces on the bed of filter material 40 while still providing an upper support plate 60 that can be adequately deformed, it may be desirable to include force distribution structures such as, for example, ribs 68 (see, for example, FIG. 4) that may preferably be distributed over the surface of the support plate 60. The ribs 68 may enhance distribution of the force over the support plate 60 salt extends across the bed of filter material 40.

Orientation of the ribs 68 in the depicted embodiment may be preferably be generally parallel to an axis 76 that extends into and out of the page in FIG. 8. The curvature imparted to the bed 40 by the support plates 50 and 60 may preferably be determined with reference to the axis 76 or one or more axes. The curvature may be uniform or it may vary over the surface of the bed 40. Examples of suitable curved surfaces may be defined by one or more ellipses, circles, etc. In one manner of characterizing the curvature, it may be preferred that the radius of curvature at one or more points or sections of the major surfaces of the support plate 60 be, for example, 1 meter or less, more preferably 0.5 meters or less, and even more preferably 20 centimeters or less (as defined about an axis such as, far example, axis 76).

In another manner of characterizing the curvature in the filter beds and support plates of the present invention, it may be preferred that the deflection imparted to at least a portion of the support plate as a result of the deformation (from the respective configurations seen in FIGS. 6 & 7) measured along an axis normal to one of the major surfaces of the support plate 60 as seen in FIG. 6 be 5 millimeters or more, preferably 10 millimeters or more.

The curvature provided may be defined about two or more axes, and those two or more axes may be parallel to each other or not. For example, it may be preferred that the curvature be compound curvature such that, for example, concave or convex surfaces may be imparted to the bed 40 and surrounding structures (for example, support plates). The curvature selected may preferably be designed to, for example, match the contour of a facepiece to which the cartridge is to be connected, to reflect anthropomorphological considerations, etc.

With the upper support plate 60 in place and attached to the housing base 30, the filter cartridge 10 is then essentially ready for use. Cover 20 can be placed over the opening defined by the housing base 30 and secured in place as discussed herein.

Figure 9:
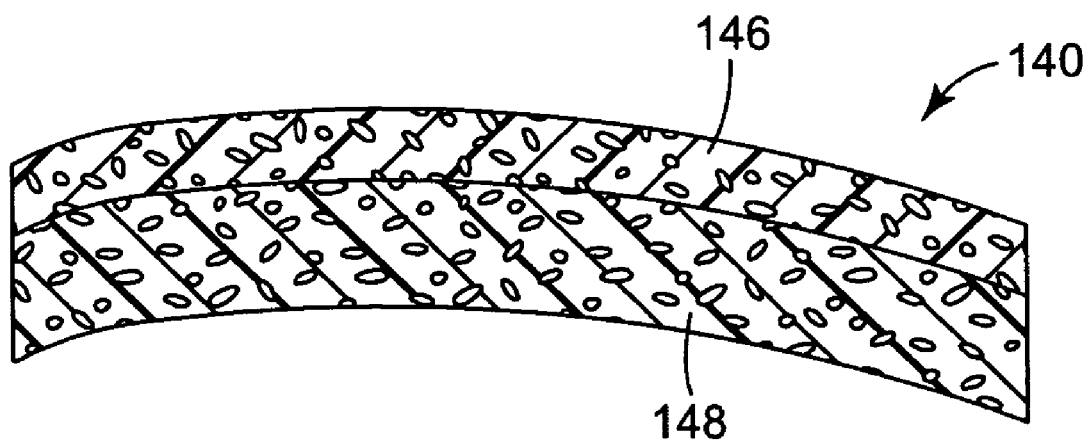
FIG. 9 is a cross-sectional view of a multi-layer bed of filter material.

FIG. 9 is a cross-sectional view of a multi-layer bed of filter material 140 that may be manufactured with curvature for use in a conformal filter cartridge as described herein. The bed 140 preferably includes distinct layers 146 and 148 of filter material. It may be preferred that the filter material in each layer be different, for example, have different adsorption characteristics. Such a filter bed 140 may be used, for example, to filter different vapors or gases from fluid stream using one bed of filter material in a conformal filter cartridge of the present invention. It may be preferred that the different layers 146 and 148 include filter material in the form of loose particles and that the particles be deposited by storm-filling as discussed herein. In some instances, the filter materials in the different layers 146 and 148 may consist essentially of different filter materials.

Although the depicted multi-layer bed 140 includes only two layers, a multilayer bed used in a conformal filter cartridge may include any selected number of layers provided that integrity between the layers can be maintained during manufacturing and use. Techniques for maintaining integrity between the layers may include, for example, providing porous sheets between the layers 146 and 148, selecting different constant particle size distributions in adjacent layers that mitigate migration of particles between the different layers, etc.

Although the conformal filter cartridges of the present may be used in any filtering apparatus, they may be particularly well-suited to respirators designed to be worn by humans. Also, although described herein as essentially for filtering air before breathing to remove, for example, noxious vapors, gases, etc., the conformal filter cartridges may also be used to filter air exhaled by a wearer. Examples of some suitable filtering apparatus with which the conformal filter cartridges of the present invention may be used may include, for example, powered air purifying respirators (PAPRs) (see, for example, U.S. Pat. Nos. 6,250,299, 6,186,140, 6,014,971, 5,125,402, 4,965,887, 4,462,399, and 4,280,491). Another class of filtering apparatus with which the conformal filter cartridges of the present invention may be used are self contained breathing apparatus (SCBA) (see, for example, U.S. Pat. Nos. 6,478,025, 4,886,056, 4,586,500, and 4,437,460).

Figure 10:
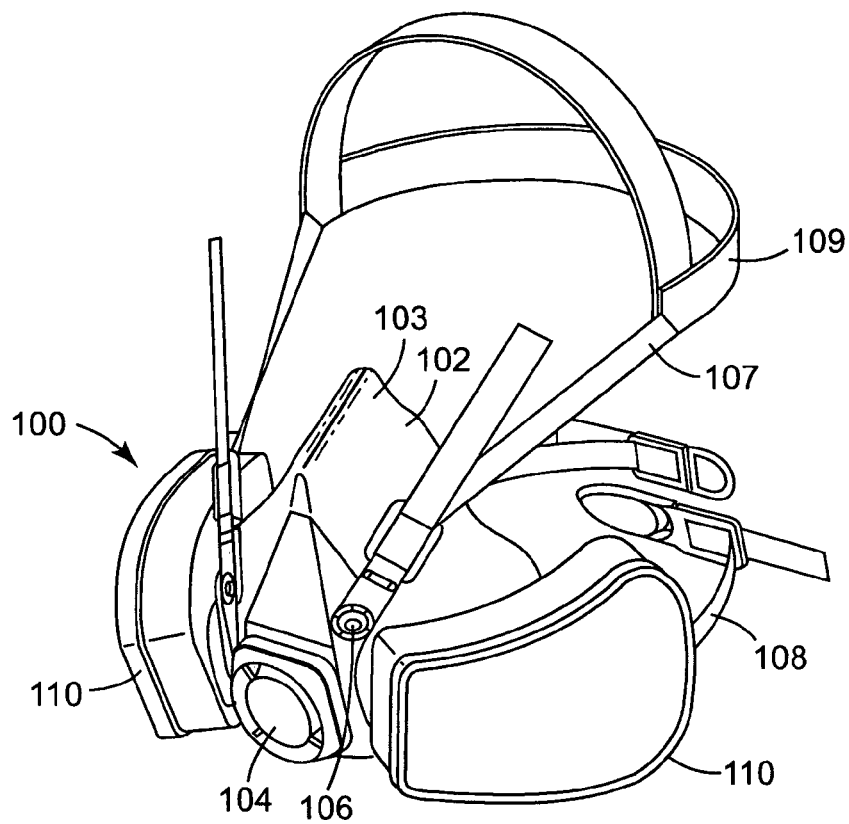
FIG. 10 is a perspective view of one respirator incorporating conformal filter cartridges of the invention.
Figure 11:
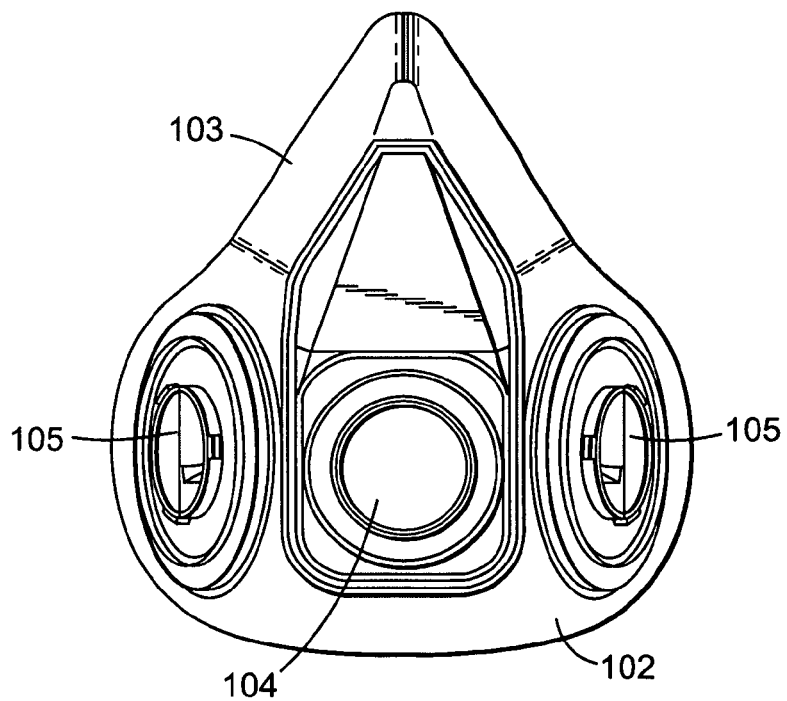
FIG. 11 is a front view of the respirator of FIG. 10 with the filter cartridges and headbands removed from the facepiece.

FIGS. 10 and 11 depict one exemplary embodiment of a half-mask respirator that is adapted to fit over the nose, mouth, and chin of the wearer (although the conformal filter cartridges may also be used in connection with "full face" mask bodies that cover the eyes as well—see, for example, U.S. Pat. No. 5,924,420). The mask 100 includes a face-piece 102 that may be produced by, for example, injection molding a soft, compliant material (for example, a rubber material) and that has an inturned cuff (not visible in the drawings) around its edge. When the mask is worn, the cuff preferably forms a seal against the wearer's skin. The face-piece 102 has a central portion 103 that preferably extends over the bridge of the wearer's nose, in which is preferably mounted an exhalation valve 104. On opposing sides of the exhalation valve 104, the face-piece 102 supports inhalation valves (not visible) over which conformal filter cartridges 110 are mounted. Attachments 106 are located on the sides of the face-piece 102 for upper and lower headbands 107 and 108 (only those for the upper headband being shown) that form part of a head harness, which harness also includes a cradle 109, fashioned to fit on top of the wearer's head.

The filter cartridges 110 may be releasably attached to the mask 100 by bayonet fittings such as those described in, for example, U.S. Pat. Nos. 4,850,346; 4,934,361; 5,924,420; 6,216,693. The bayonet fittings are not visible in FIG. 10, but one part of one fitting is indicated at 105 in FIG. 11.

The use of a bayonet connection to attach the filter cartridges 110 to the respirator face piece 102 is not essential, and other forms of attachment could be used in place of bayonet connections. One alternative connection structure includes snap-fit filter cartridges (see, for example, U.S. Pat. No. 5,579,761). Another alternative includes a threaded filter cartridge that is attached to a corresponding threaded fitting on the respirator body (see, for example, U.S. Pat. Nos. 4,422,861; 4,548,626; 5,022,901; 5,036,844; 5,063,926; and 5,222,488).

In use, the headbands 107 and 108 may be adjusted to fit the head of the wearer and to hold the mask 100 against the wearer's face. Examples of harnesses that may be used in connection filtering apparatus in the form of respirators may include those described in U.S. Pat. Nos. 6,715,490, 6,591,837, and 6,119,692 to Byram et al., and in U.S. Pat. Nos. 6,732,733 and 6,457,473 to Brostrom et al.

When the wearer breathes in, air is preferably drawn into the mask 100 through the filter cartridges 110 and then through the inhalation valves in the cheek portions of the face-piece 102. When the wearer breathes out, air may preferably be expelled from the mask 100 through the exhalation valve 104 located in the central portion 103 of the depicted mask body 102. The two conformal filter cartridges 110 of the mask 100 may preferably be identical to each other or different. The latter may be advantageous where one filter cartridge is applied to inhalate filtering and the second filter cartridge is applied to exhalate filtering (with appropriate valving).

As used herein and in the appended claims, the singular forms "a," "and," and "the" include plural referents unless the context clearly dictates otherwise. Thus, for example, reference to "a" or "the" component may include one or more of the components and equivalents thereof known to those skilled in the art.

All references and publications cited herein are expressly incorporated herein by reference in their entirety into this disclosure. Exemplary embodiments of this invention are discussed and reference has been made to some possible variations within the scope of this invention. These and other variations and modifications in the invention will be apparent to those skilled in the art without departing from the scope of the invention, and it should be understood that this invention is not limited to the exemplary embodiments set forth herein. Accordingly, the invention is to be limited only by the claims provided below and equivalents thereof.

The invention claimed is:

1. A method of manufacturing a conformal filter cartridge, the method comprising:

providing a housing that comprises a housing base and a housing cover, wherein the housing base and the housing cover define an enclosed volume when assembled together, wherein the housing further comprises an inlet port and an outlet port;

depositing a bed of filter material within the housing base, wherein a first support plate is located within the housing base before the depositing and wherein a major surface of the first support plate faces the filter material;

deforming the first support plate after depositing the bed of filter material, wherein after deformation the major surface of the first support plate that faces the filter material comprises curvature about at least one axis; and attaching the housing cover to the housing base, wherein the bed of filter material is contained within the housing such that a fluid to be filtered passes through the inlet port, the filter material, and the outlet port, and wherein the first support plate retains the curvature about at least one axis after attaching the housing cover to the housing base.

2. A method according to claim 1, further comprising placing a second support plate over the bed of filter material after depositing the bed of filter material; wherein the bed of filter material is located between a major surface of the first support plate and a major surface of the second support plate.

3. A method according to claim 2, further comprising deforming the second support plate, wherein after deformation the major surface of the second support plate facing the filter material comprises curvature about at least one axis.

4. A method according to claim 2, further comprising attaching one or more locations about the periphery of the second support plate to the housing.

5. A method according to claim 2, further comprising welding one or more locations about the periphery of the second support plate to the housing.

6. A method according to claim 1, wherein the deforming comprises deflecting at least a portion of the first support plate 5 millimeters or more.

7. A method according to claim 1, wherein the filter material comprises loose particulate filter material.

8. A method according to claim 1, wherein depositing the bed of filter material comprises storm-filling.

9. A method according to claim 1, wherein the thickness of the bed of filter material above the major surface of the first support plate is uniform over the major surface after the deforming.

10. A method according to claim 1, wherein the bed of filter material comprises two or more layers of different filter materials, wherein at least one layer of the two or more layers consists essentially of one filter material.

11. A method according to claim 10, wherein the two or more layers of different filter materials are deposited by storm-filling.

12. A method according to claim 1, wherein the first support plate comprises:
an opposing major surface that faces and is spaced from an interior surface of the housing base; and
a plurality of openings formed through the first support plate, wherein fluid passes through the plurality of openings when entering or exiting the bed of filter material.

13. A method according to claim 2, wherein the second support plate comprises:
an opposing major surface that faces and is spaced from an interior surface of the housing cover; and
a plurality of openings formed through the second support plate, wherein fluid passes through the plurality of openings when entering or exiting the bed of filter material.

14. A method according to claim 1, further comprising providing a porous sheet between the first support plate and an interior of the housing base.

15. A method according to claim 2, further comprising providing a porous fibrous sheet between the bed of particulate material and the second support plate.

16. A conformal filter cartridge comprising:
a housing comprising an inlet and an outlet;
a bed of filter material contained within the housing such that a fluid to be filtered passes through the inlet, the filter material, and the outlet;
a first support plate positioned between the bed of filter material and the outlet, wherein the first support plate comprises a major surface facing the bed of filter material that comprises curvature about at least one axis; and
a second support plate positioned between the bed of filter material and inlet, wherein the second support plate comprises a major surface facing the bed of filter material that comprises curvature about at least one axis;
wherein at least a portion of the bed of filter material is retained under residual compression between the first and second support plates;
and wherein the first support plate, the second support plate and the bed of filter material are all retained in a curved shape in the housing of the conformal filter cartridge as assembled.

17. A conformal filter cartridge according to claim 16, wherein the filter material comprises loose particulate filter material.

18. A conformal filter cartridge according to claim 16, wherein the thickness of the bed of filter material between the major surface of the second support plate and the major surface of the first support plate is uniform over the major surfaces of the first and second support plates.

19. A conformal filter cartridge according to claim 16, wherein the curvature of at least one of the first support plate and the second support plate is the result of elastic deformation.

20. A conformal filter cartridge according to claim 16, wherein the curvature of both of the first support plate and the second support plate is the result of elastic deformation.

21. A conformal filter cartridge according to claim 16, wherein the curvature of the major surface of the second support plate comprises a radius of curvature at one or more points or sections of the major surface of 1 meter or less.

22. A conformal filter cartridge according to claim 20, wherein the elastic deformation comprises deflection of at least a portion of the first support plate by 5 millimeters or more.

23. A conformal filter cartridge according to claim 16, wherein the second support plate comprises:
an opposing major surface that faces and is spaced from an interior surface of the housing: and
a plurality of openings formed through the second support plate, wherein fluid passes through the plurality of openings into the bed of filter material.

24. A conformal filter cartridge according to claim 16, wherein the first support plate comprises:
an opposing major surface that faces and is spaced from an interior surface of the housing; and
a plurality of openings formed through the first support plate, wherein fluid passes through the plurality of openings when exiting the bed of filter material.

25. A conformal filter cartridge according to claim 16, wherein one or more locations about the periphery of at least one of the first support plate and the second support plate are attached to the housing.

26. A conformal filter cartridge according to claim 16, wherein one or more locations about the periphery of at least one of the first support plate and the second support plate are welded to the housing.

27. A conformal filter cartridge according to claim 16, further comprising a porous sheet positioned between the bed of particulate material and the first support plate.

28. A conformal filter cartridge according to claim 16, further comprising a porous sheet positioned between the bed of particulate material and the second support plate.

29. A conformal filter cartridge according to claim 16, wherein the bed of filter material comprises two or more layers of different filter materials, wherein at least one layer of the two or more layers consists essentially of one filter material.

30. A conformal filter cartridge according to claim 16, wherein the housing base and the second support plate comprise cooperating alignment structures.

31. A filtering apparatus comprising one or more conformal filter cartridges according to claim 16.

32. A filtering apparatus according to claim 31, wherein the filtering apparatus further comprises a facepiece adapted to fit over at least the nose and mouth of a wearer, wherein the one or more conformal filter cartridges are operatively attached to the facepiece, and wherein the filtering apparatus comprises a respirator.

* * * * *

UNITED STATES PATENT AND TRADEMARK OFFICE
CERTIFICATE OF CORRECTION

PATENT NO. : 7,419,526 B2  Page 1 of 1
APPLICATION NO. : 11/071664
DATED : September 2, 2008
INVENTOR(S) : Paul A. Greer It is certified that error appears in the above-identified patent and that said Letters Patent is hereby corrected as shown below:

<u>Cover Page, U.S. Patent Documents item (56)</u>
Page 2, Column 2, delete "Redmond et al." and insert -- Jones et al. --, therefor.

<u>Column 5</u>
Line 40, after "2" insert -- is --.

<u>Column 8</u>
Line 33, delete "In" and insert -- in --, therefor.
Line 45, delete "salt" and insert -- as it --, therefor.
Line 59, delete "far" and insert -- for --, therefor.

Signed and Sealed this

Eleventh Day of November, 2008

JON W. DUDAS
*Director of the United States Patent and Trademark Office*